United States Patent [19]

Menon

[11] Patent Number: 4,920,083

[45] Date of Patent: Apr. 24, 1990

[54] NOVEL PROCESS FOR THE PRODUCTION OF CERAMIC FLAKES

[75] Inventor: Venugopal B. Menon, Chapel Hill, N.C.

[73] Assignee: Research Triangle Institute, Research Triangle Park, N.C.

[21] Appl. No.: 195,649

[22] Filed: May 18, 1988

[51] Int. Cl.[5] .............................................. C04B 35/48
[52] U.S. Cl. ..................................... 501/84; 501/103; 501/95; 252/321; 264/42; 264/50
[58] Field of Search .................. 501/103, 84; 252/321; 252/307, 350; 423/573; 264/42, 45.6, 50, 54; 521/100

[56] References Cited

U.S. PATENT DOCUMENTS

| | | | |
|---|---|---|---|
| 3,041,190 | 6/1962 | Griffth et al. ......................... | 501/84 |
| 3,194,671 | 7/1965 | Yavorsky et al. .................... | 501/103 |
| 3,560,231 | 2/1971 | Moore et al. .......................... | 264/42 |
| 3,915,887 | 10/1975 | Okabe et al. ........................ | 252/307 |
| 4,365,011 | 12/1982 | Bernard et al. ..................... | 501/103 |
| 4,501,818 | 2/1985 | Rossi ................................... | 501/103 |

*Primary Examiner*—William R. Dixon, Jr.
*Assistant Examiner*—Susan Hollenbeck
*Attorney, Agent, or Firm*—Oblon, Spivak, McClelland, Maier & Neustadt

[57] ABSTRACT

A method for the production of ceramic oxide lakes, comprising the steps of: (i) preparing a colloidal foam by blowing a gas into an aqueous solution comprising a precursor salt of said ceramic oxide flake and a surfactant; (ii) precipitating flakes of said precursor salt in said colloidal foam; and (iii) dry and calcining said precipitated flakes to produce said ceramic oxide flakes.

20 Claims, 2 Drawing Sheets ns, fire extinguishing foams, foam fractionation and petroleum operations, for example, in drilling operations.

Applicant has now discovered an economical and efficient process for the production of ceramic oxide flakes using a foam reactor. The process of the present invention produces ceamic oxide flakes having consistent particle sizes and enables control of the relative particle size of the ceramic oxide flakes.

NOVEL PROCESS FOR THE PRODUCTION OF CERAMIC FLAKES

BACKGROUND OF THE INVENTION

1. Field of the Invention

The invention relates to the production of ceramic oxide flakes, and in particular, the preparation of ceramic oxide flakes using a foam reactor.

2. Discussion of Background

The economical production of ceramic oxide flakes is of continuing industrial importance. Ceramic oxide flakes may be used for preparing ceramic coatings on substrates as well as for producing coating pigments. Flakes or high aspect ratio powders or particles when coated on a substrate offer high surface coverage, and therefore substantially reduce the amount of material required to coat a given surface. Alumina and titania have potential applications in pigments and coatings while zirconia flakes can be used in preparing more uniform electronic and magnetic tapes and devices.

A further use of ceramic flakes is the reinforcement of ceramic matrices. Conventional research in the reinforcement of ceramic matrices has focused on fibers and whiskers. However, the one dimensional nature of fibers and whiskers poses distinct limitations on their use in components requiring multidirectional strength properties. Flakes, therefore, have the potential for developing reinforced composites with optimum optical, mechanical and thermal properties in two dimensions. For example, to achieve planar reinforcement with fibers or whiskers requires the use of multiple crossplies which results in approximately 60% reduction in mechanical properties in any one direction. With flakes, it is possible to achieve planar reinforcement directly, since they display planar isotropic characteristics. Bimetallic flakes have been used to reinforce metals such as aluminum (see Hertzberg, R. W. "Potential of Unidirectionally Solidified Eutectic Alloys as Reinforced Composites", *Fiber Composite Materials*, ASM, p. 77 (1965) and glass flakes have been found to improve the Young's modulus and flexural strength of composite materials (see Oleesky, S. and Mohr, G. *Handbook of Reinforced Plastics*, Reinhold, p. 148 (1964).

Several processes for preparing glass, metal and ceramic flakes are known. For example, U.S. Pat. No. 3,066,065 discloses a process for preparing glass flakes by drawing molten glass into an extremely thin sheet from which the glass flakes are produced. U.S. Pat. No. 3,340,006 discloses a method for producing flakes of a metal oxide, such as oxides of titanium, indium, tantalum, zirconium and tin. Additionally, U.S. Pat. No. 3,888,687 and SU-408,937 disclose compositions containing ceramic oxide flakes.

A continuing need exists, however, for new economical and convenient methods of preparing ceramic oxide flakes. The present invention is directed to such a novel process which utilizes the unique characteristics of foams in the production of ceramic oxide flakes.

Foams are coarse dispersions of gas in a relatively small amount of liquid. Foams have been studied scientifically with regard to the behavior of liquid films and have been used in a wide variety of consumer and industrial applications. For example, foams have found particular application in shampoos, shaving creams, and other consumer compositions which require long-lived foams. Foams have also found applications in the area of froth floatation, e.g., in the separation of mineral materi

SUMMARY OF THE INVENTION

One object of the present invention is a process for the production of ceramic oxide flakes which is economical and continuous and produces ceramic oxide flakes having high aspect ratios.

Another object of the invention is a process for the production of ceramic oxide flakes which provides control of particle size and the rate of particle formation.

These and other objects which will become apparent from the following specification have been achieved by the present method of producing ceramic oxide flakes, which comprises the steps of (i) preparing a colloidal foam by blowing a gas into an aqueous solution comprising a precursor salt of said ceramic oxide flake and a surfactant; (ii) precipitating flakes of said precursor salt in said colloidal foam; and (iii) drying and calcining said precipitated flakes to produce said ceramic oxide flakes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
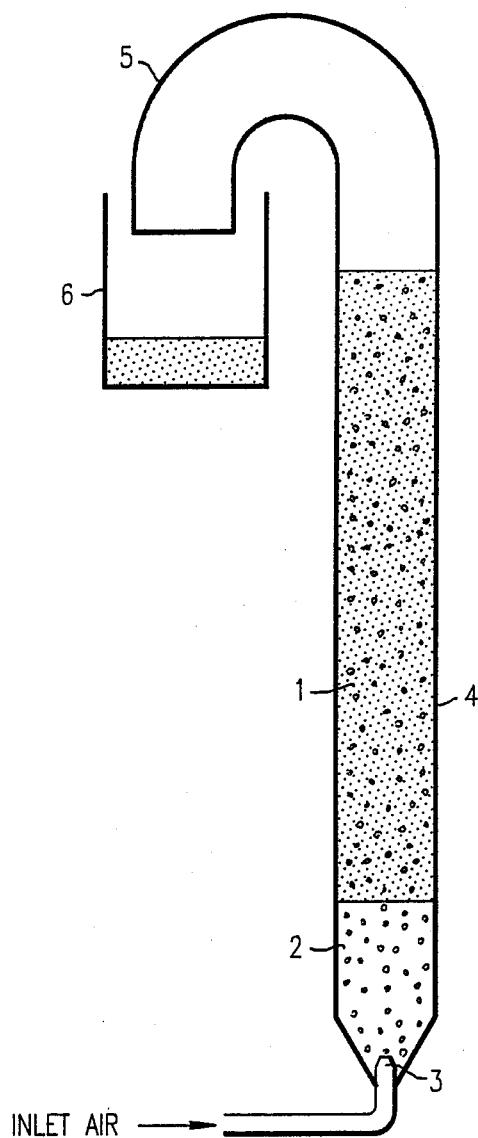
FIG. 1 illustrates a schematic diagram of a foam reactor suitable for use in the present invention.

The process of the present invention utilizes a colloidal foam reactor to prepare ceramic oxide flakes or powders. FIG. 1 illustrates a schematic diagram of a typical foam reactor suitable for use in the present invention. Foam reactor 1 comprises a tubular reactor into which an aqueous precursor salt/surfactant solution 2 is placed. A gas is blown into the surfactant solution by means of nozzle 3 to generate foam 4 which rises up the tubular reactor. Ceramic oxide flakes produced by the present process pass through reactor outlet 5 and are subsequently captured in a collection container 6.

Foams are coarse dispersions of gas in a relatively small amount of liquid. Foams may be generally prepared by blowing a gas into surfactant containing liquid to generate foam bubbles. The bubbles which are produced are dependent on the diameter of the nozzle through which the gas entering the surfactant solution is blown. Generally, bubbles ranging in size from several microns to several millimeters can be easily prepared. In the process of the present invention, the orifice of nozzle 3 may vary in size from submillimeter diameters to about 6 mm in diameter and will correspondingly produce bubbles having a diameter of below 1 mm to approximately 6 mm. For the process of the present invention, the orifice size and consequently a bubble size in the range of approximately 1-4 mm in diameter is preferred, with an orifice of approximately 2 mm being especially preferred.

Figure 2:
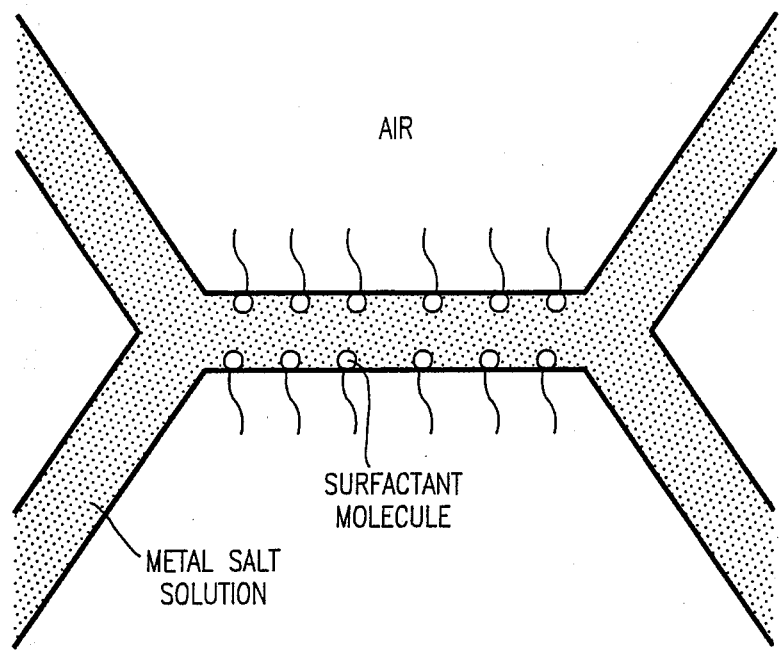
FIG. 2 illustrates a cross section of a foam lamellae produced in a foam reactor.

The bubbles which constitute the fame are stabilized by the presence of a surfactant or foaming agent. The foaming agent segregates spontaneously at the gas/liquid surface of the foam bubbles. The interface between any two foam bubbles in the foam generates a foam lamellae between the bubbles as shown in FIG. 2. Although thermodynamic stability is not conferred upon the foam by the presence of the foam stabilizers or surfactants, the surfactants do reduce the decay rate of the foam. As the foam bubbles rise in the foam reactor, the liquid films which constitute the walls of the bubble and lamellae are subjected to external stresses imposed by gravity and capillary forces that pull the liquid downward and outward in regions of convex curvature in the foam structure. As the foam rises in the reactor, therefore, the lamellae gradually contract reducing the liquid volume in the lamellae themselves.

In the present process, the surfactant solution which is placed in the base of the foam reactor contains a precursor salt which is substantially soluble in the aqueous surfactant solution. As the foam bubbles are formed, the dissolved precursor salt is localized in the lamellae of the foam structure. As the foam rises in the bubble reactor, the lamellae become thinner and the volume is reduced in the lamellae due to the external forces of gravity and capillary action. The volume decrease results in a change in the solubility of the precursor salt and the subsequent reprecipitation of the precursor salt within the foam lamellae. The dimensions of the foam bubbles, therefore, determine the size of the ceramic flakes which are produced.

As the foam containing the precipitated salt flakes rises in the foam reactor, the foam structure is gradually destroyed resulting in wet flakes of the reprecipitated precursor salt. The wet reprecipitated precursor salt flakes may then be collected, dried and calcined by conventional methods to obtain ceramic oxide flakes. Conventional methods of drying and calcining the reprecipitated precursor salt flakes are well known to those skilled in the art and the particular method which is used will depend on processing and engineering considerations. A typical calcining process employs temperatures in the range of 500°-1000° C.

If the height of the foam reactor column is suitably chosen, the wet reprecipitated salt flakes may be easily collected as they pass out of the top of the foam reactor. In a preferred embodiment, the reactor height is adjusted so that the wet reprecipitated salt flakes are dried as they continue upward in the foam reactor and may be subsequently collected as dried flakes. As the wet flakes progress up the tubular column, the gas flowing upward through the column and the degradation of the foam structure results in a gradual drying of the reprecipitated precursor salt flakes. The height of the reactor column may be adjusted so as to allow for substantially complete drying of the reprecipitated precursor salt flakes at the point at which the dried flakes exit the top of the foam reactor. One may thereby collect the dried precursor salt flakes and subsequently calcine the dried flakes to produce the ceramic oxide flakes themselves.

By continually supplying precursor salt surfactant solution to the base of the foam reactor, and by continually collecting and calcining the dried flakes which issue from the top of the foam reactor, one can continuously produce ceramic oxide flakes. Alternatively, a batchwise process may be used in which a specific volume of reprecipitated flakes is produced, dried and calcined. However, a continuous process is preferred and is the most economical embodiment of the present invention.

The rate of production of ceramic flakes may be easily controlled by the rate at which the gas is blown into the base of the foam reactor. By increasing the rate of gas flow, the foam will rise more rapidly in the reactor column and the rate of flake production will be increased. When the foam production rate is increased, however, one must generally increase the height of the foam reactor column so as to continuously collect dry flakes.

The minimum rate of gas flow into the surfactant solution is that rate at which a foam will be produced. The maximum gas flow rate is the rate at which the foam becomes unstable and begins to coalesce and form excessively large bubbles. When the gas flow rate through nozzle 4 is too great, the foam becomes unstable and large bubbles form by coalescence, resulting in non-uniform particle or flake size. Additionally, the use of an excessively high gas flow rate will result in a short foam travel time to the top of the column and the ceramic flakes will be impropery dried. The optimum gas flow rate will be readily determined by engineering and production requirements and can be correlated with the foam reactor column height by means of simple preliminary testing.

Precursor salts which are suitable for use in the present process include all water soluble salts which will reprecipitate in the foam lamellae under the process conditions. Non-limiting examples of suitable precursor salts include all substantially water-soluble aluminum, zirconium, and yttrium salts. Examples include aluminum sulfate, zirconium sulfate, zirconium nitrate, aluminum hydroxide, aluminum sulfate, yttrium nitrate and yttrium sulfate as well as hydrates and mixtures of these salts. The surfactant solution may contain a pure precursor salt if a ceramic flake having a single component is desired, or a mixture of precursor salts may be used for the production of complex ceramic flakes. The precursor salt is generally used in concentrations ranging from a few grams per liter to greater than 400 grams per liter based on the surfactant solution. The upper limit of the precursor salt concentration is determined by the solubility product of the specific precursor salt. In general, the precursor salt will be used in concentrations slightly below the saturation point. Preferred precursor salt concentrations are from about 1 to 400 grams per liter, with concentrations in the range of about 100 to 350 grams per liter being particularly preferred for aluminum sulfate.

Suitable gases for use in the present invention include all gases which are nonreactive with the precursor salts and are not foam breaking gases. Gases such as air, enriched air, oxygen, nitrogen and inert gases are all suitable for use in the present invention. Carbon dioxide is a foam breaking gas and will generally not produce satisfactory results in the present process.

Surfactants or foaming agents which are suitable for use in the present invention include all conventional soaps, detergents and cationic, anionic and amphoteric surfactants which are known for the production of foams. Examples include alkali and alkaline earth metal salts of long-chain alkyl carboxylic, sulfonic and phosphoric acids, as well as long-chain alkyl ammonium salts; however any suitable surfactant may be used. Particularly preferred surfactants are the alkali and alkaline earth metal salts of $C_{10\text{-}20}$ alkyl sulfates and $C_{10\text{-}20}$ alkyl ammonium salts, with sodium lauryl sulfate being particularly preferred. The foaming agent or surfactant is generally used in amounts ranging from about 1 to about 1000 parts per million relative to the overall precursor salt surfactant solution, with a preferred concentration range from 500 to 800 parts per million.

The ceramic flakes which are produced by the present process exhibit high aspect ratios and are typically about 0.1–5 micron, preferably 0.5–1 micron, in thickness and about 3–300 microns, preferably 3–200 microns, in surface diameter. As noted above, the thickness and surface diameter of the flakes is directly related to the chemical nature of the salt, the flow rate of the gas which is blown into the precursor salt-surfactant solution and the nozzle diameter. The flakes produced by the present process are generally irregular at the edges and may take on arbitrary shapes. Particularly preferred flakes are those having a thickness of about 0.1–1 microns and a surface diameter of about 3–200 microns.

To obtain a high strength ceramic oxide flake, the dried precursor salt flake which are collected from the top of the foam reactor may be further dried and calcined according to known processes to obtain the ceramic oxide powder.

In a preferred embodiment of the present invention, the air which is blown into the precursor salt surfactant solution is first saturated or nearly saturated with a volatile lower alcohol or ketone to accelerate drying of the flakes. The alcohol or ketone which is present in the gas decreases the solubility of the precursor salt in the foam lamellae and facilitates drying of the precursor salt flakes as they pass upwards through the foam reactor column. Alcohols which are suitable for saturation of the blowing gas are volatile alcohols such as methanol, ethanol, propanol and isopropanol. A preferred ketone is acetone. Higher alcohols are less volatile and result in degradation of the product particles and incomplete drying.

In a particularly preferred embodiment, air is first dried by passing it through one or more filters such as a silica gel and/or activated carbon filter and subsequently through a particle filter which traps particles which are $\geq 0.1$ micron in size. The dried and filtered air is then pass through an ethanol or acetone bubbler and subsequently blown into the precursor salt surfactant solution.

In interesting embodiment of the invention, the reduced solubility of the precursor salt in alcohol can be used to prepare precursor salt spheres as well as flakes. If the wet foam is allowed to exit from the top foam reactor, and collected in an alcohol-containing collector vessel, the precursor salt forms spheres which immediately precipitate in the alcohol solution and may be subsequently collected. The foam reactor may, therefore, be used for the interchangeable production of either ceramic flakes or ceramic spheres by the adjustment of the column height and collection apparatus. The reprecipitated precursor salt spheres may be conventionally dried and calcined to prepare ceramic oxide spheres. Yttrium sulfate has proven to be particularly useful in this embodiment.

The production of ceramic flakes using a foam reactor, as discussed above, involves the reprecipitation of a precursor salt from a surfactant solution. However, the precursor salt may be generated in situ by means of a chemical reaction in which precursor reactants are mixed in the base of the foam reactor to produce the precursor salt. For example, aluminum sulfate may be prepared by reacting aluminum hydroxide and sulfuric acid in which the product aluminum sulfate forms and is precipitated in the foam lamellae and subsequently dried and collected as aluminum sulfate flakes. In the reaction between aluminum hydroxide and sulfuric acid, the only product which is produced in addition to aluminum sulfate is water. Such reactions are preferable since they do not produce contaminating side product salts.

Accordingly, the reaction of an acid with a base to produce the precursor salt and water is a preferred type of chemical reaction when one wishes to generate the precursor salt in situ. Similar chemical reactions for the production of various other salts from the corresponding precursor bases and acids will be readily apparent to one skilled in the art and are within the scope of the present invention.

Other features of the invention will become apparent in the course of the following descriptions of exemplary embodiments which are given for illustration of the invention and are not intended to be limiting thereof.

EXAMPLES

EXAMPLE 1

A vertical column, 70 cm high and 5 cm internal diameter (i.d.) and made of acrylic was used to bubble clean, dry air through a mixture of aqueous metal salt solution and surfactant. The aqueous solution was prepared by adding 20.0 g aluminum sulfate crystals ($Al_2(SO_4)_3$) supplied by Fisher Scientific Company) to 60 $cm^3$ of deionized water. The aluminum sulfate crystals contained 16 to 18 moles of hydrate per mole of salt. To aid in dissolving the solute, the solution was heated to approximately 80° C. for a few minutes. Upon the complete dissolution of the $Al_2(SO_4)_3$, 0.08 g of sodium lauryl sulfate (SLS) was added to the solution with mild agitation. Care was taken to avoid excessive agitation, because this will cause frothing.

Before entering the nozzle at the base of the column, the air was regulated to 6 psia, dried in a packed column of silica, and filtered using a 0.1 micron HEPA cartridge filter. The nozzle was made of a stainless steel tube of 0.2 cm i.d. The nozzle exit was about 5 cm below the level of the metal salt solution in the column. By adjusting the air flowrate to the nozzle, foam bubbles of controlled size, varying from 0.1 to 0.3 cm diameter were generated. Above the liquid level, the foam bubbles formed a honeycomb-like structure which rose to the top of the column. The rate of bubble formation controlled the rate of rise of foam.

As the foam rose to the top of the column, the upper portions of the foam bubbles dried, and particles of aluminum sulfate were precipitated. These particles were collected in a small glass container. Some agglomeration was observed depending on the degree of dryness of the particles. The collected particles were then calcined in a quartz boat at 850° C. for 2 hours to obtain flakes of alumina.

EXAMPLE 2

The procedure described above was also followed for producing ceramic particles of zirconia. Here, 15 g of zirconium sulfate tetrahydrate (Alfa Products) was dissolved in 60 cm$^3$ of deionized water, and 0.08 g of the surfactant sodium lauryl sulfate was added to this solution. Using the procedure described in Example 1, particles of zirconium sulfate were reprecipitated in flake form. They were subsequently calcined to produce zirconia. The particle size of zirconium flakes was observed to be much smaller than that for aluminum sulfate. Particles were also prepared where the starting metal salt solution was a mixture of 13 g zirconium sulfate and 0.35 g yttrium sulfate. In this case the final product was yttria stabilized zirconia.

EXAMPLE 3

The same procedure as Examples 1 and 2, except that the dry air was passed through an ethanol solution prior to entry into the column. The air was bubbled through a glass bottle filled with 1000 cm$^3$ of ethanol. The sulfates of aluminum, zirconium and yttrium are insoluble in ethanol, and the use of air saturated with the alcohol helped to precipitate and dry the particles quicker.

EXAMPLE 4

The same procedure as Example 3, except that the dry air was passed through an acetone solution prior to entry into the column. The air was bubbled through a glass bottle filled with 1000 cm$^3$ of acetone. The sulfates of aluminum, zirconium and yttrium are insoluble in acetone, and the use of air saturated with the alcohol helped to precipitate and dry the particles quicker.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the production of ceramic oxide flakes, comprising the steps of:
   (i) preparing a colloidal foam by blowing a gas into an aqueous solution comprising a precursor salt of said ceramic oxide flake and a surfactant;
   (ii) precipitating flakes of said precursor salt in said colloidal foam; and
   (iii) drying and calcining said precipitated flakes to produce said ceramic oxide flakes.
2. The method of claim 1, wherein said surfactant is present in an amount from about 1 part per million to about 1000 parts per million.
3. The method of claim 1, wherein said surfactant is an alkali or alkaline earth metal salt of a long-chain alkyl carboxylic sulfonic or phosphoric acid.
4. The method of claim 3, wherein said surfactant is an alkali or alkaline earth $C_{10-20}$ alkyl sulfate.
5. The method of claim 1, wherein said surfactant is a cationic surfactant.
6. The method of claim 5, wherein said cationic surfactant is a $C_{10-20}$ alkyl ammonium salt.
7. The method of claim 1, wherein said precursor salt is a substantially water-soluble aluminum, zirconium, or yttrium salt.
8. The method of claim 7, wherein said precursor salt is selected from the group consisting of aluminum sulfate, zirconium sulfate, zirconium nitrate, aluminum hydroxide, aluminum sulfate, yttrium nitrate and yttrium sulfate, hydrates and mixtures thereof.
9. The method of claim 1, wherein said precursor salt is present in an amount from 1 gram per liter to about 400 grams per liter.
10. The method of claim 9, wherein said precursor salt is present in an amount from about 100 grams per liter to about 350 grams per liter.
11. The method of claim 1, wherein said ceramic oxide flakes have a thickness of from 0.1 to about 5 microns and a surface diameter from about 3 to about 300 microns.
12. The method of claim 11, wherein said ceramic oxide flakes have a thickness from about 0.5 to about 1 micron and a surface diameter of about 3–200 microns.
13. The method of claim 1, wherein said preparing and precipitating steps occur in a tubular foam reactor.
14. The method of claim 13, wherein said drying step also occurs within said tubular reactor.
15. The method of claim 1, wherein said gas is saturated or nearly saturated with a volatile lower alcohol or ketone before said gas is blown into said aqueous solution.
16. The method of claim 15, wherein said alcohol is selected from the group consisting of methanol, ethanol, propanol and isopropanol.
17. The method of claim 15, wherein said ketone is acetone.
18. The method of claim 1, wherein said gas is filtered or dried before being blown into said aqueous solution.
19. The method of claim 1, wherein said precursor salt is produced by a chemical reaction in said aqueous solution.
20. The method of claim 19, wherein said chemical reaction comprises reacting an acid and a base to produce said precursor salt and water.

* * * * *